US007738480B2

(12) United States Patent
Iwamura

(10) Patent No.: US 7,738,480 B2
(45) Date of Patent: Jun. 15, 2010

(54) HYBRID ACCESS TO A CONTENTION-FREE PERIOD CHANNEL

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1068 days.

(21) Appl. No.: 11/278,142

(22) Filed: Mar. 31, 2006

(65) Prior Publication Data

US 2007/0230499 A1 Oct. 4, 2007

(51) Int. Cl.
*H04L 12/413* (2006.01)
*G05B 11/01* (2006.01)

(52) U.S. Cl. ............... 370/447; 370/461; 370/462; 340/310.11

(58) Field of Classification Search ........... 370/310, 370/340, 341, 431, 445, 447, 464, 465, 276, 370/277, 280, 442, 443, 458, 461, 462; 340/310.01, 340/825, 3.1, 3.5, 3.51
See application file for complete search history.

(56) References Cited

U.S. PATENT DOCUMENTS

| | | | | |
|---|---|---|---|---|
| 6,114,968 | A * | 9/2000 | Ramakrishnan et al. .... | 340/3.51 |
| 6,297,797 | B1 | 10/2001 | Takeuchi et al. | |
| 6,671,284 | B1 * | 12/2003 | Yonge et al. ............... | 370/462 |
| 6,996,088 | B1 * | 2/2006 | Kroon et al. ............... | 370/341 |
| 7,082,257 | B2 | 7/2006 | Yamauchi et al. | |
| 7,400,642 | B2 * | 7/2008 | Koo et al. ................... | 370/447 |
| 7,403,538 | B1 * | 7/2008 | Ho ............................. | 370/443 |
| 2002/0105970 | A1 | 8/2002 | Shvodian | |
| 2004/0184406 | A1 | 9/2004 | Iwamura | |
| 2004/0261101 | A1 | 12/2004 | Iwamura | |
| 2005/0276276 | A1 * | 12/2005 | Davis ......................... | 370/447 |
| 2007/0025384 | A1 * | 2/2007 | Ayyagari et al. ............ | 370/445 |
| 2007/0055988 | A1 | 3/2007 | Iwamura | |
| 2007/0058665 | A1 * | 3/2007 | Ho et al. ..................... | 370/447 |
| 2008/0175265 | A1 * | 7/2008 | Yonge et al. ................ | 370/447 |
| 2008/0279123 | A1 * | 11/2008 | Struhsaker et al. .......... | 370/280 |

OTHER PUBLICATIONS

U.S. Appl. No. 60/714,797, filed Sep. 7, 2005 Iwamura.
*HomePlug AV White Paper*, http://www.homeplug.org/en/docs/HPAV-White-Paper_050818.pdf, 2005.

* cited by examiner

*Primary Examiner*—Ricky Ngo
*Assistant Examiner*—Paul Masur
(74) *Attorney, Agent, or Firm*—Fitch, Even, Tabin & Flannery

(57) ABSTRACT

To increase bandwidth, a channel, which normally is limited to contention-free transmissions, is used for other purposes during times when it is not needed for contention-free transmissions. Although the channel is located in a contention-free portion of a beacon cycle, supplemental uses of this channel include the contention-based transmission of data that normally would be sent during a contention portion of the cycle. These transmissions include those made under the CSMA protocol.

38 Claims, 10 Drawing Sheets

HYBRID ACCESS TO A CONTENTION-FREE PERIOD CHANNEL

FIELD OF INVENTION

This pertains generally to network communication systems, and more particularly, to methods of prioritized data transmission.

BACKGROUND

Network design options include contention-free networks and contention-based networks. In a typical contention-free network, one of the devices on the network manages time slot use. In response to requests from other devices wanting to send a data stream, available time slots are allocated by a time slot manager. Once assigned, a transmitter can generally continue to use a time slot, uninterrupted by other streams, until the transmission ends. The original data stream packet intervals that are transmitted over the network are reconstructed by a receiver on the network. An advantage of contention-free communication is that quality of service (QoS) is very high.

However, contention-free networks also have some disadvantages. For example, if the time slot manager is disconnected, another device must take over the time slot management, thus requiring that other devices on the network also be configured with time slot management capability which, in turn, increases network device cost. Furthermore, in response to device connection or disconnection, a full bus reset occurs that disturbs bus communications. Contention-free control operates satisfactorily on a dedicated, noise-free network such as IEEE 1394, but it often is not well suited for use on networks subject to harsh transmission conditions such as an 802.11 wireless network or a power-line communications (PLC) network.

In a typical contention-based network (such as, for example, an Ethernet network), traffic is often controlled using the Carrier Sense Multiple Access (CSMA) protocol. Under CSMA, when one device on the network wants to communicate with another device, the transmitter first detects whether there is a carrier on the bus. If no carrier is detected, then the device commences communication. If however a carrier is detected, then the transmitter enters a back-off mode, and after a delay, attempts the process once again. The wait time during back-off is generally randomized so that two waiting devices do not collide again. Under a conventional CSMA protocol, the bus is not controlled by a time slot manager.

Contention-based networks have both advantages and disadvantages. One advantage is that users are allowed to freely connect or disconnect devices on or from the network without the penalty of a bus reset. Each device need not be concerned with the network status, i.e., what devices are or are not connected to the network. The network interface is simple and low-cost, because no time slot management capability is required. A disadvantage is that QoS is not guaranteed, and therefore when the network is busy, devices are subject to indeterminate wait intervals.

Currently, advances in network design have resulted in an expanded use of home networks. Popular standards include the 802.11 wireless standard and the "HomePlug™ 1.0" power line communications (PLC) network standard. Both of these standards are Ethernet-equivalent and do not provide QoS for audio-visual (AV) data streaming or other uses. Although other network standards such as IEEE 1394 provide QoS, they are not well suited to a number of applications due to a limited cable transmission range, and because cables must be routed from device to device, such as between rooms in a household.

While the existing PLC standard does not have QoS, a next generation PLC standard, "HomePlug™ AV," is expected to have this. Under this standard, beacon cycles are divided into a contention period (CP) that employs a CSMA or similar protocol and a contention-free period (CFP). Contention-based communications will use the CP which is on first-come, first-served basis. No time allocation is reserved within this portion of the beacon cycle. The CFP is used for contention-free data transmission, especially AV streaming and voice over Internet protocol (VoIP) streaming. Once a time allocation is reserved within the CFP portion of the beacon cycle, the transmitter uses that allocation period, or "channel," every beacon cycle until all of the data is sent and the transmission terminates. No other traffic is permitted to disturb the transmission.

PLC networks operate under harsh conditions. Signal attenuation is high—especially for a long distance transmission. Also, there are many noise sources, such as for example, hair dryers, lamp dimmers, switching regulator power supplies, etc. Thus packet errors do occur occasionally in these conditions. To solve these errors, a transmitter in a PLC network needs quality of service (QoS) transmission capabilities, i.e., to retransmit the erroneous or missed packets. Usually, a contention-free transmission (such as, for example, the transmission of AV data) reserves only a required minimum bandwidth in the CFP. There is no bandwidth reserved for retransmission of missing packets.

Reserving a bandwidth or channel for QoS transmissions would provide a useful feature for the transmission of AV data or other data over a PLC network. However reserving a channel for QoS transmissions represents an inefficiency in the use of overall CFP bandwidth, because such a channel would not be used for significant amounts of time. Thus there is a need to improve the use of bandwidth while at the same time allowing bandwidth for error recovery or other priority uses.

SUMMARY OF THE ILLUSTRATED EMBODIMENTS

According to an embodiment of the invention, a channel (i.e., a "hybrid channel"), which normally is limited to contention-free transmissions, is used for contention-based transmissions during times when it is not needed for contention-free transmissions, in order to increase bandwidth. Although the channel is located in a contention-free period or portion of a beacon cycle, supplemental uses of this channel include transmissions of data that normally would be sent during the contention period or portion of the cycle. These transmissions are contention-based, such as that which are made under the CSMA protocol.

In one aspect, data is communicated over a network using a communications protocol that includes the use of a plurality of communication cycles. Each of the plurality of communication cycles has a contention-based cycle portion and an contention-free cycle portion. The contention-free cycle portion includes a channel such as, for example, the so-called "hybrid channel." A first command to set a flag to a first status is sent over the network to a first processor.

A first set of data is received. The first set of data includes the flag and corresponds to the beginning of one of the plurality of communication cycles. A second command to set the flag to the first status is sent to the first processor if the flag in the first set of data was not set to the first status. The first status of the flag corresponds to a permission to use the channel for contention-based transmissions. A second status of the flag corresponds to a permission to use the channel for contention-free transmissions.

In an alternative embodiment, a first command to set the flag to the second status is sent over the network to the first processor. A first set of data is received. The first set of data includes the flag and corresponds to the beginning of one of the plurality of communication cycles. A second command to set the flag to the second status is sent to the first processor if the flag in the first set of data was not set to the second status. Data is transmitted as contention-free data using the channel if the flag is set to the second status.

In an alternative embodiment, a determination is made whether a contention-free transmission of data over the channel is needed during one of the plurality of communication cycles. A flag (located in a portion of the channel) is set to the first status if there was no determination that contention-free transmission of data over the channel is needed. The flag is set to the second status if there was a determination that a contention-free transmission of data over the channel is needed. Data is transmitted as contention-free data over the channel if there was a determination that a contention-free transmission of data over the channel is needed.

In yet another embodiment, the flag is received. If the flag is set to the first status, a first determination is made whether the channel is in use. If the channel was in use based upon the first determination, a second determination is made whether the channel is in use. The second determination is made after waiting a time period after making the first determination. The length of the time period is randomly determined. A first set of data is sent as contention-based data using the channel if it has been determined that the channel is not in use.

In one aspect, a second set of data corresponding to the beginning of one of the plurality of communications cycles is received. The second set of data includes the flag.

In another aspect, the flag is located in a portion of the channel.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
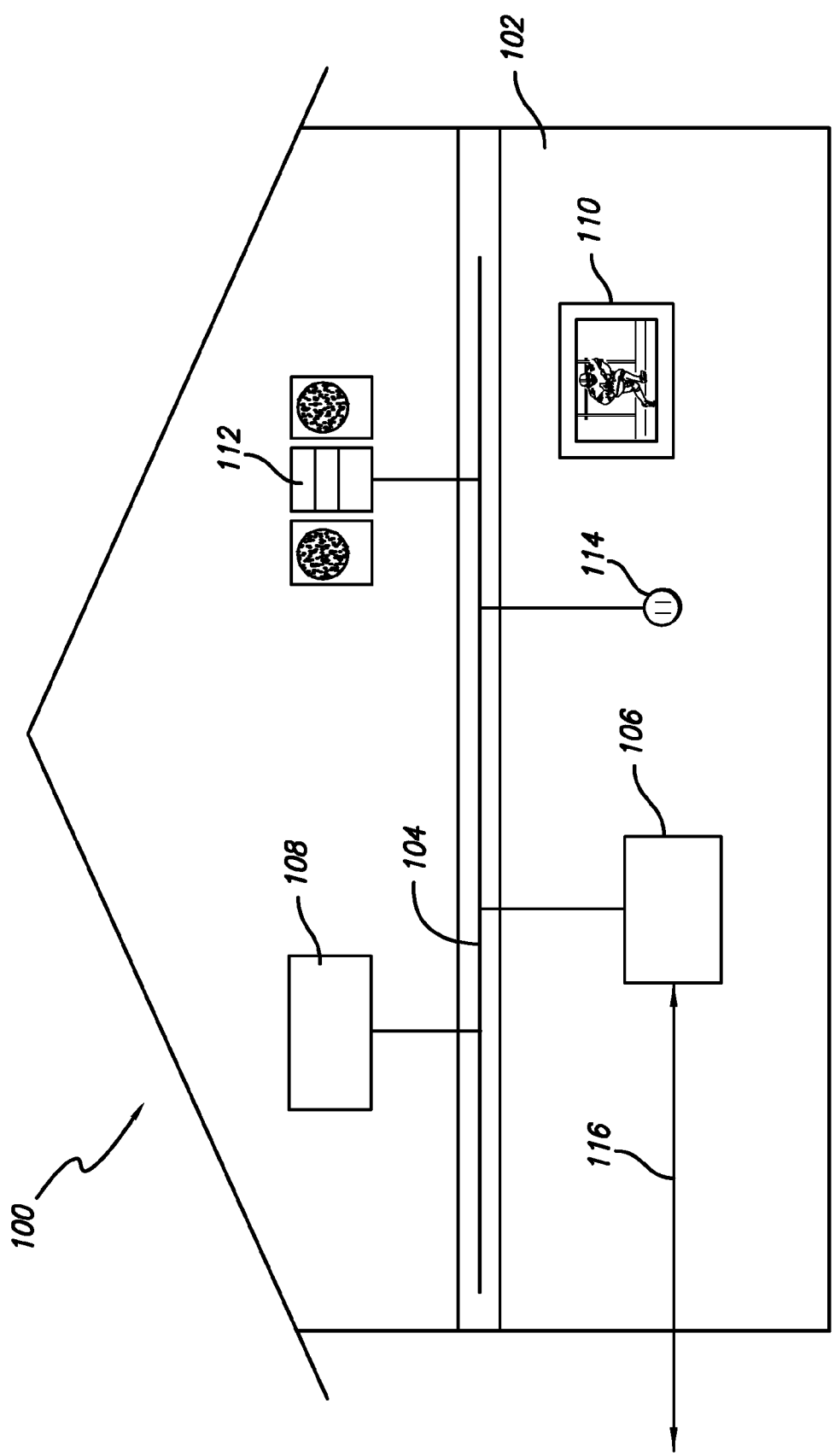
FIG. 1 is a simplified block diagram of a residential PLC network.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

According to embodiments of the invention, a so-called "hybrid channel," which normally is limited to contention-free transmissions, is used for other purposes during times when it is not needed for contention-free transmissions thus increasing bandwidth. Although the hybrid channel is located in the CFP portion of the beacon cycle, supplemental uses of this channel include transmissions of data that normally would be sent during the CP (i.e., contention-based data transmissions, such as that which are transmitted under the CSMA protocol).

The bandwidth allocation and reservation techniques described herein may be used in a number of different types of networks, and are well suited for use on PLC networks. By way of example, the description herein is in terms of use on a PLC network. However, all or portions of the description are applicable to other network forms, such as wireless networks and other networks.

FIG. 1 illustrates an example of a distributed system operating over a residential PLC network 100. A residential dwelling 102 is shown having an AC power line 104 which interconnects a number of rooms. The PLC network 100 comprises a first server 106 (such as for example, a video server), a second server 108 (such as for example, an audio server), a first client 110 (such as for example, a television set) and a second client 112 (such as for example, an audio system), all of which are connected to the power line 104, typically by way of AC outlets such as the unused outlet 114 in FIG. 1. For the sake of clarity, the external connection of the AC power line 104 to a distribution transformer is not shown.

A cable 116 connects the first server 106 to an outside source, such as the Internet, in order to provide access to various content, such as cable programming, Internet connectivity, etc. It will be appreciated that other forms of connectivity, including both wired and wireless forms, may be received by the system.

The first server 106 is configured for storing AV data and is capable of sending AV data streams to one or more clients on the PLC network. An AV content stream from the cable 116, as received by the first server 106, can be transmitted to clients, such as the first or second clients 110, 112, as well as to other servers. The first and second servers 106, 108 in this example operate with similar functionality.

Figure 2:
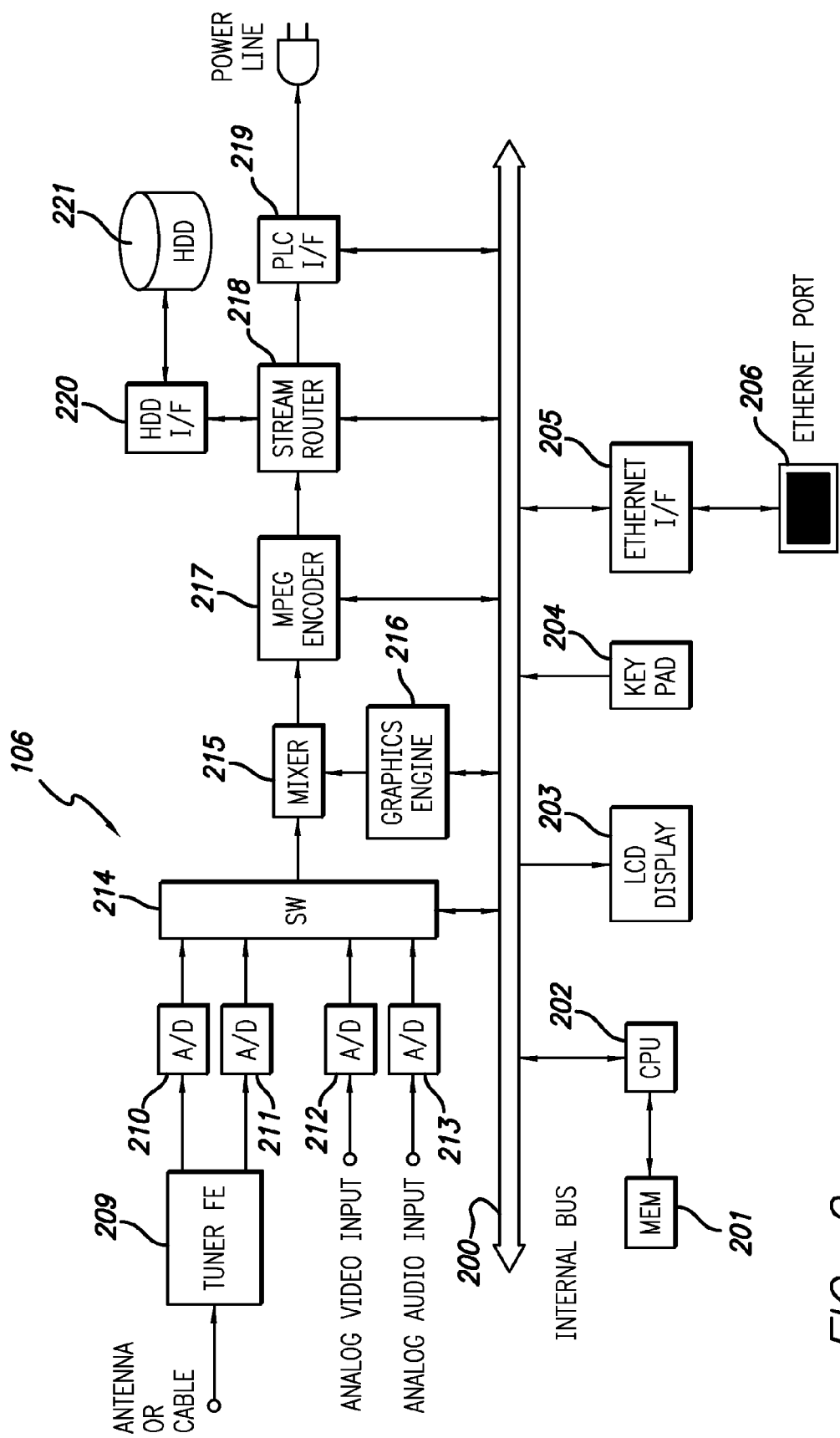
FIG. 2 is a simplified block diagram of a server for use in a PLC network according to an embodiment of the invention.

FIG. 2 is a simplified block diagram of the first server 106 which in this example is a video server. An analog cable signal is received and is tuned and demodulated in a tuner/front-end 209. The video analog output from the tuner/front-end 209 is converted to a digital signal by an analog to digital converter 210 and sent to a switch 214. The output of the analog to digital converter 210 is, for example, ITU-R BT.656 format. Similarly, the audio analog output from the tuner/front-end 209 is converted to a digital signal by another analog to digital converter 211 and sent to the switch 214.

In the same way, external analog audio and video signals are received and converted to digital signals by third and fourth analog to digital converters 212, 213 and sent to the switch 214. The external analog source is, for example, a DVD player. The switch 214 controls which signals are sent to a mixer 215, either the AV signals from the tuner/front-end 209, or the AV signals from the external source. The mixer 215 receives the AV signals from the switch 214 and mixes or multiplexes them with graphic user interface (GUI) data generated by a graphics engine 216. The result is MPEG-encoded in a MPEG encoder 217.

The MPEG encoder 217 encodes the incoming AV stream at a fixed or a variable rate and forwards the encoded stream to a stream router 218. The stream router 218 routes the incoming stream to an appropriate direction, either to a PLC interface 219 for network transmission over the power line 104 (FIG. 1) or to a hard disk drive (HDD) interface 220 for storing the data stream to a hard disk drive 221. The stream router 218 also receives a playback stream from the hard disk drive interface 220 and sends the stream to the PLC interface 219.

A CPU 202 or processor controls all of the components through an internal bus 200. The CPU 202 runs the control software program stored in a memory 201. A keypad 204 sends user input data to the CPU 202 through the bus 200. A LCD display 203 indicates the data sent from the CPU 202 (e.g., tuning status, network status, error messages, etc.) A cable/phone line modem (not shown) is connected to an Ethernet port 206. Data from the modem is sent to the CPU 202 via an Ethernet interface 205.

Figure 3:
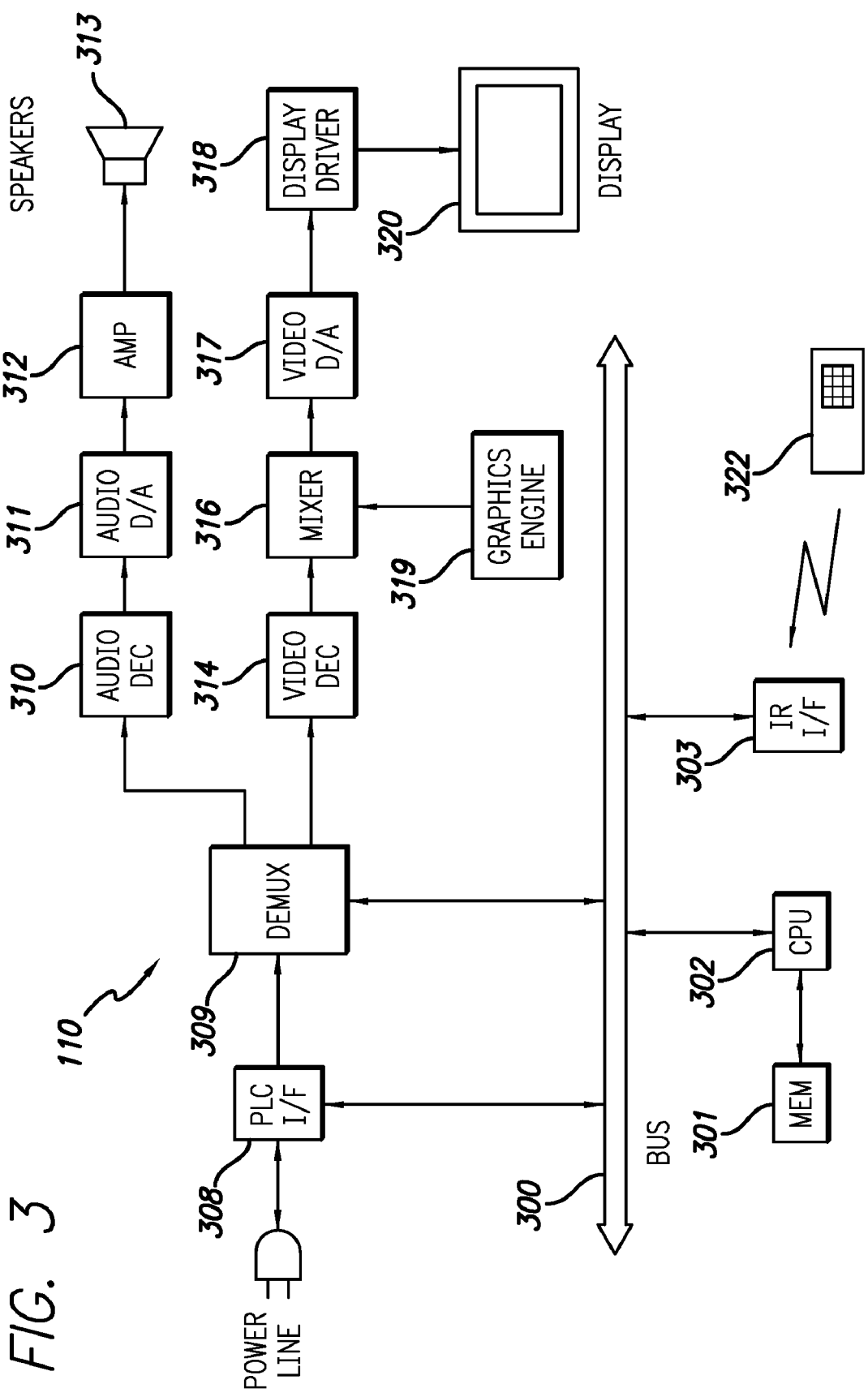
FIG. 3 is a simplified block diagram of a client device for use in a PLC network according to an embodiment of the invention.

FIG. 3 is a simplified block diagram of the first client 110, which in this case is a television set. A PLC interface 308 receives a signal sent over the power line 104. The output signal from the PLC interface 308 is demultiplexed in a demultiplexer 309 and sent to an audio decoder 310 and a video decoder 314, respectively. A mixer 316 receives decoded video signals from the video decoder 314 and mixes them with graphics data generated in a graphics engine 319. The digital output of the mixer 316 is converted to an analog signal by a video digital to analog converter 317. The result is sent to a display driver 318 and displayed on a display screen 320.

The audio decoder 310 sends digital decoded audio signals to a digital to analog converter 311 which in turn outputs an analog signal to an amplifier 312. The amplified analog signal is then sent to one or more speakers 313. The digital to analog converter 311, the amplifier 312 and the speakers 313 may handle two or more audio channels (e.g., left and right channels).

A client CPU 302 or processor exchanges contention-based data (commands, data, etc.) over the power line 104 with the server CPU 202 in the first server 106. The client CPU 302 controls all of the components in the first client 110 through an internal bus 300. The client CPU 302 also runs a control software program stored in a memory 301. An infrared (IR) interface 303 receives commands from an infrared remote controller 322. The commands are sent to the client CPU 302 via the bus 300. If required, the commands are also forwarded to the server CPU 202 in the first server 106 over the power line 104. While FIG. 3 shows an infrared remote controller, alternative embodiments may employ other types of remote controllers as well.

According to one embodiment of the invention, one of the servers 106, 108 is designated to be the "master" server. In FIG. 1, the second server 108 (i.e., the audio server in this example) is the master. The second server 108, or master, broadcasts a beacon periodically. In this embodiment, the beacon cycle is synchronized to the AC power line cycle (i.e., 50 or 60 Hz).

Figure 4:
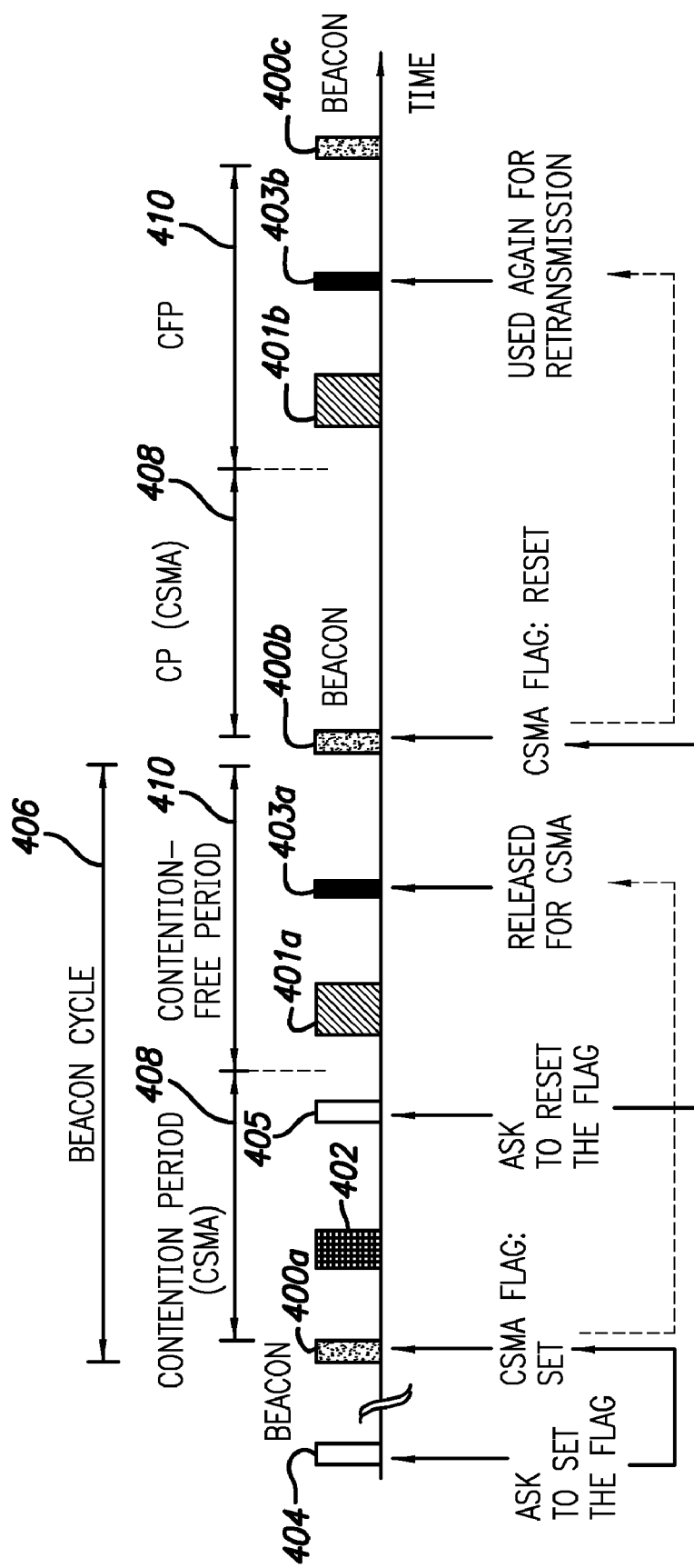
FIG. 4 is a timing diagram according to an embodiment of the invention.

FIG. 4 is a timing diagram illustrating a communication or beacon cycle 406 in accordance with an embodiment of the invention. The beacon cycle 406 includes a contention period (CP) 408 and a contention-free period (CFP) 410. In this embodiment, the beacon cycle is 33.3 milliseconds, the CP 408 is 15 milliseconds, and the CFP is 18.3 milliseconds. However, other embodiments may use other time periods. A plurality of beacons 400a, 400b, 400c mark the beginning of each beacon cycle 406. One set of data is transmitted as contention-based data during a time allocation 402 within the CP 408 of the first beacon cycle 406. A stream of other data, such as AV data, is transmitted as contention-free data during another time allocation 401a, 401b within the CFP 410. Yet another time allocation, also referred to as a "hybrid channel" 403a, 403b, is designated for use in the CFP 410. Time allocations for commands 404, 405 to control the use of the hybrid channel 403a, 403b are located in the CP 408.

The CP 408 is used for contention-based communications, such as communications under the CSMA protocol. In other words, a device needing to transmit data obtains a time allocation and uses this portion of the beacon cycle 406 on a first-come, first-served basis and on a one-time access basis. Thus even if a time allocation is obtained in the current beacon cycle, there is no guarantee that the same time allocation will be available for use by that device in the next beacon cycle.

The operation of the CFP portion 410 of the beacon cycle 406 is different. Before the transmitter (i.e., the first server 106) starts a transmission designated for the CFP 410, the first server 106 asks the master server (i.e., the second server 108) to provide a bandwidth (i.e., a time allocation or channel) in the CFP 410. If available, a time allocation, such as the time allocation 401a, 401b of FIG. 4, is given to the first server 106. The time allocation 401a, 401b is reserved in the CFP for use in every beacon cycle until the data stream terminates. On the other hand, the master device (i.e., the second server 108) does not manage the CP. However for each beacon cycle 406, the master device provides a beacon 400a, 400b that marks the beginning of each beacon cycle 406 and that includes information relating to each time allocation (i.e., each channel) in the CFP 410 associated with that beacon cycle. This information includes:

Channel identification number;

Start time of that channel (in micro seconds) from the beacon;

End time of that channel (in micro seconds) from the beacon;

Network address of the transmitter that desires to use the channel;

Network address of the device that will receive the data stream being transmitted over that channel (However, this address is not specified when a transmitter is to be broadcasting generally.); and Flag data which is applicable to only the hybrid channel 403a, 403b and which has a "set" status and a "reset" status.

As will be explained in more detail below, when the flag is "set," then contention-based communications are allowed for the hybrid channel 403a. When the flag is "reset," then only contention-free transmissions are allowed, and contention-based communications are prohibited for this channel. Every time a new CFP transmission starts or ends, the beacon information is renewed.

Referring to FIGS. 1 and 4, assume that the first server 106 sends an AV stream to the first client 110 (i.e., the television set) using the first time allocation 401a in the CFP 410. The hybrid channel 403a is reserved for QoS error recovery for communications using the CFP 410 portion of the beacon cycle 406.

In some network designs it is the principal purpose of the hybrid channel 403a to provide for QoS retransmissions for contention-free communications, such as AV streams, in the CFP 410. In other network designs, the hybrid channel 403a is reserved for the transmission of commands from remote control devices. However, when the hybrid channel 403a is dedicated to these or certain other uses, the channel would otherwise not be in use for a significant number of beacon cycles. For example when used for QoS transmissions, the need to retransmit a missed packet frequently accounts for only a few percent of the entire transmission. Embodiments of the invention therefore put the hybrid channel 403a to other uses during times when it is not needed for QoS or other contention-free transmission purposes, thus increasing overall bandwidth. Although the hybrid channel 403a is located in the CFP 410 portion of the beacon cycle 406, supplemental uses of the hybrid channel 403a include transmissions that are contention-based. This includes the transmission of data that normally would be sent during the CP 408 (i.e., contention-based data transmissions, such as that which are transmitted under the CSMA protocol).

There are many potential types of communications that would normally be transmitted during the CP 408, but that may be used for the hybrid channel 403a, 403b in accordance with embodiments of the invention. These communications include file transfer data and Internet communications data.

According to an embodiment of the invention, the default setting for the flag is the "reset" status, which means that use of the hybrid channel 403a for contention-based communications is prohibited. In other words, under this flag condition the hybrid channel 403a can be used only for a dedicated contention-free use, such as for example, for QoS transmissions in the CFP 410 or remote controller commands in the CFP 410. However when the first server 106 (i.e., the transmitter) does not use the hybrid channel 403a for this dedicated contention-free transmission for a predetermined period of time, the first server 106 sends a command 404 to the second server 108 (i.e., the master or audio server) to "set" the flag. This command 404 is sent during the CP 408 portion of the beacon cycle 406. Upon receipt of the command 404, the second server 108 (the master) modifies the information in the next beacon signal 400a in such a way that the flag now has a "set" status.

When another device on the network wants to use the hybrid channel 403a, that device monitors the status of the flag in the beacon 400a. If the flag is set, the monitoring device transmits data (that otherwise would be sent as contention-based transmission data in the CP 408) in the time allocation for the hybrid channel 403a that is located in the CFP 410. This transmitting device knows the time length of the time allocation for the hybrid channel 403a by reading the "end time" field of the beacon 400a. The transmission in the hybrid channel 403a is finished on or before the time allocation for the hybrid channel 403a ends for that one cycle. When two or more devices try to obtain the allocation or use of the hybrid channel 403a, a random back-off mechanism that is characteristic of the CSMA protocol is used.

When the first server 106 (the transmitter) wants to use the hybrid channel 403a again for contention-free transmission purposes, the first server 106 transmits the command 405 that requests the second server 108 (the master) to "reset" the flag. When the flag is reset in the next beacon 400b, the first server 106 reads this flag status and thus is then permitted to use the hybrid channel 403b during the following beacon cycle 406 for contention-free transmissions in the CFP. During the time that the first server 106 uses the hybrid channel, no other device on the network is permitted to attempt use of that channel.

Figure 6:
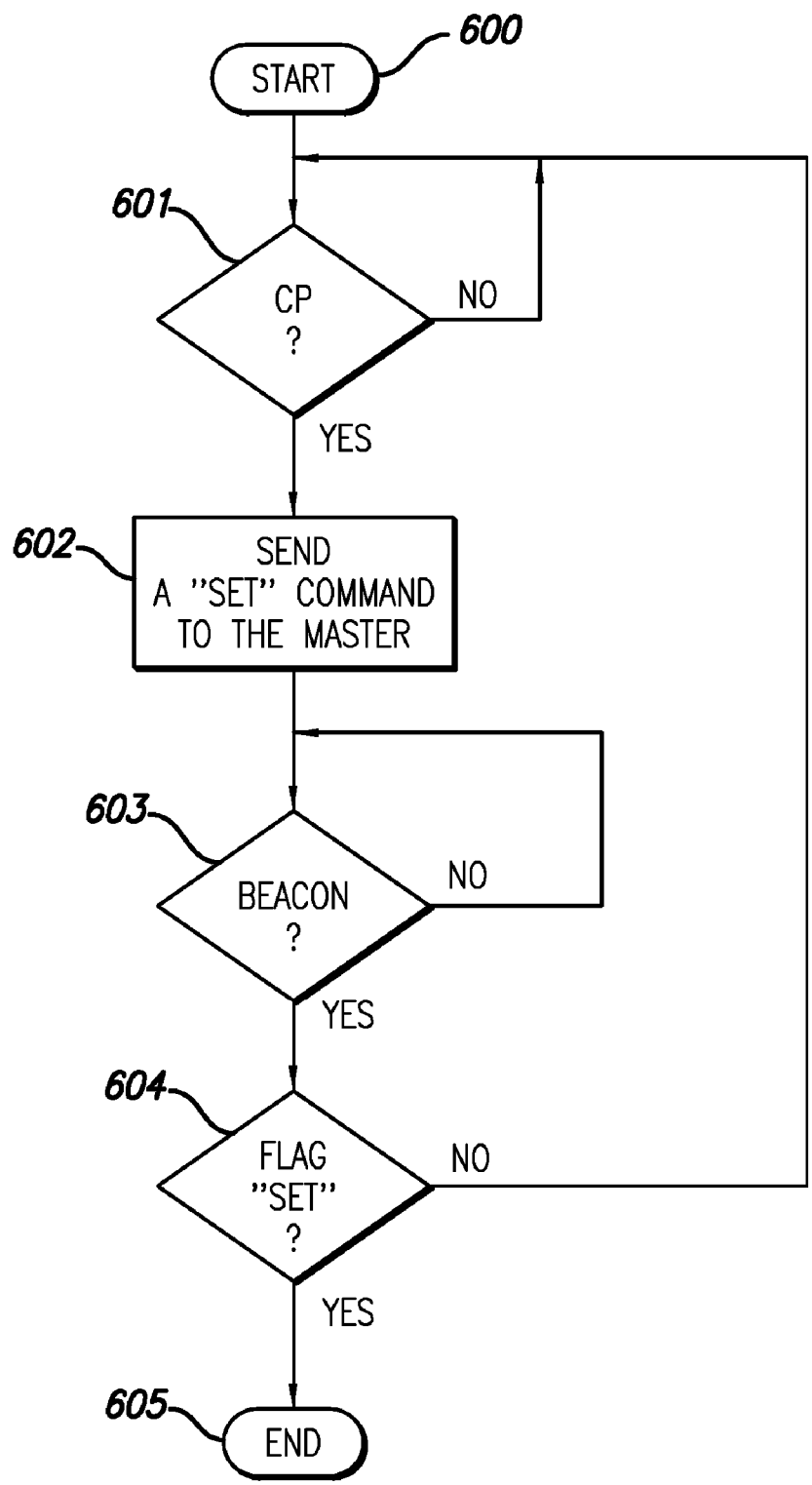
FIG. 6 is a process flow diagram showing the operation of a transmitter according to an embodiment of the invention.

FIG. 6 is a process flow diagram showing the operation of a transmitter, such as for example the first server 106 of FIG. 1, when it is desired that the transmitter release the hybrid channel for contention-based communications (i.e., for communications that otherwise would be transmitted as contention-based data in the CP) by any device on a network. This transmitter is adapted to transmit during the CFP, but has determined that contention-free transmissions currently are not needed. The process starts at step 600 and then proceeds to a waiting loop (Step 601) for the arrival of the CP in the beacon cycle. When the CP arrives, a command to set a flag to the "set" status is sent to the master during the CP. (Step 602) Then the process proceeds to another waiting loop (step 603) for the arrival of the next beacon.

When the next beacon arrives, the process proceeds to step 604 where a determination is made whether the flag in that beacon has been "set" by the master. If the flag is set, this indicates that the hybrid channel may be used by any device on the network for contention-based communications, and the process terminates. (Step 605) On the other hand, if the flag is not set for some reason, then the process loops back to step 601 where the flow proceeds from that point forward as previously described, and another attempt is made to set the flag.

Figure 7:
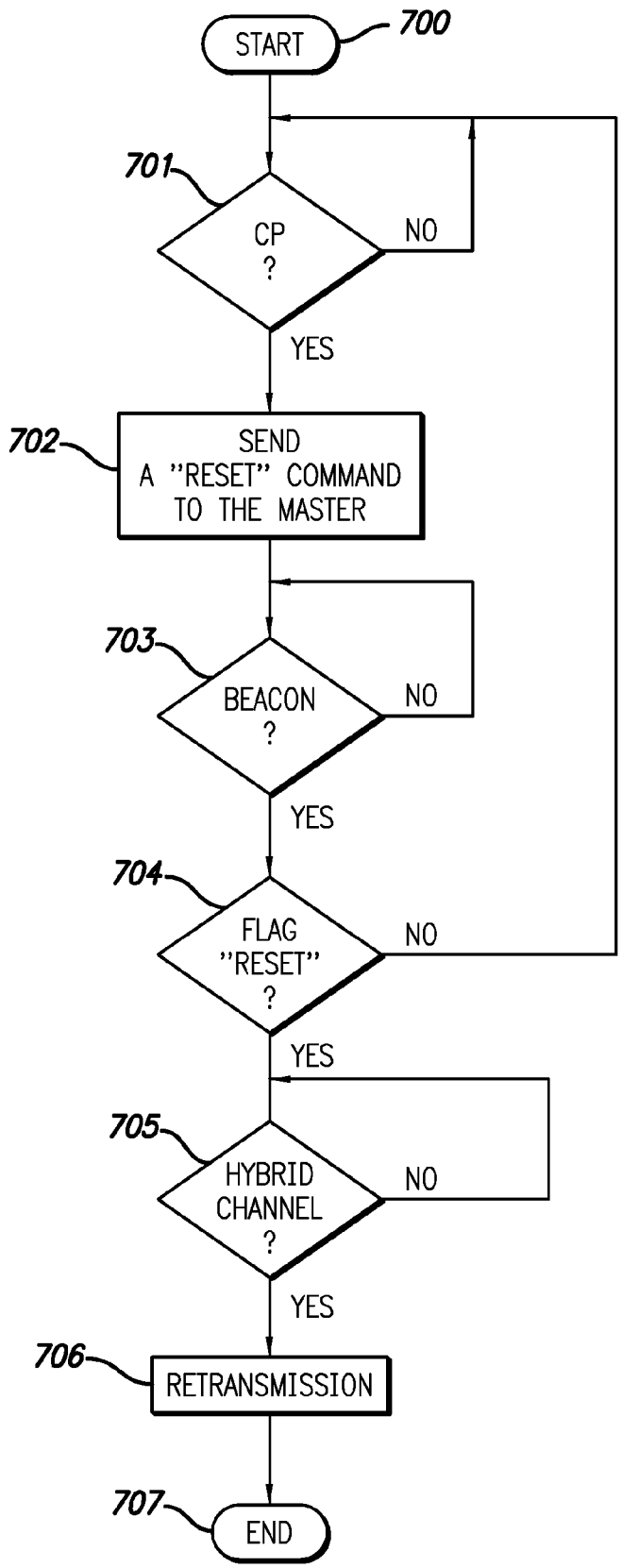
FIG. 7 is a process flow diagram showing the operation of a transmitter according to another embodiment of the invention.

FIG. 7 is a process flow diagram showing the operation of a transmitter when it is desired that the transmitter "retrieve" the hybrid channel for use for contention-free communications, such as for example, for QoS purposes. The process starts at step 700 and proceeds to a waiting loop (step 701) during which the process waits for the arrival of the CP in the beacon cycle. When the CP arrives, a command to set a flag to the "reset" status is sent to the master. (Step 702). Then the process proceeds to another waiting loop (step 703) to await the arrival of the next beacon.

When the beacon arrives, the process proceeds to step 704 where a determination is made whether the flag in that beacon in the "reset" status. If the flag is in the reset status, this indicates that the transmitter may use the hybrid channel for normal contention-free communications (e.g., QoS retransmissions). The process would then proceed to another waiting loop (step 705) during which the system waits until the arrival of the hybrid channel. When the hybrid channel arrives, a CFP transmission occurs (e.g., a retransmission of the missing data packet(s)) (step 706) after which the process terminates. (Step 707) Returning to step 704, on the other hand if the flag is not in a "reset" status (i.e., the flag is "set"), then the process loops back to step 701 where the flow proceeds from that point forward as previously described, and another attempt is made to reset the flag.

Figure 8:
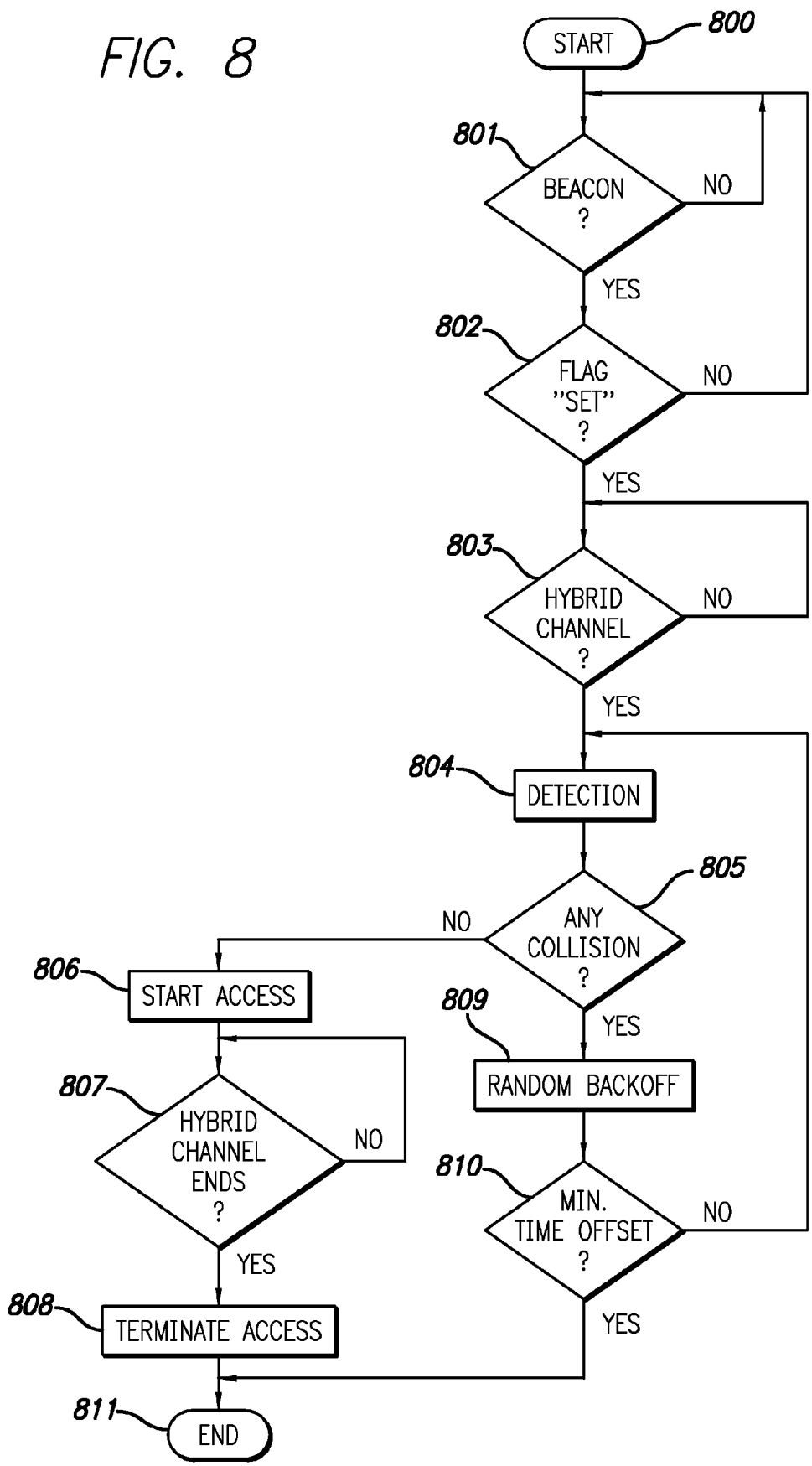
FIG. 8 is a process flow diagram showing the operation of another network device according to another embodiment of the invention.

FIG. 8 is a process flow diagram showing the operation of another network device for contention-based communications on the hybrid channel when additional network devices may also be using or trying to use the hybrid channel for the same purposes. The process starts at step 800 and proceeds to a waiting loop (step 801) during which the process waits for the next beacon. When the next beacon arrives, a determination is made whether the flag is set. (Step 802) If the flag is not set (i.e., it is "reset"), then this indicates that contention-based communications are not allowed for the hybrid channel at this point in time, and the process loops back to step 801 to wait for the following beacon. On the other hand if the flag is set, then this indicates that the hybrid channel is available for contention-based communications by any device on the network. Therefore, the process proceeds to another waiting loop (step 803) during which the process waits for the arrival of the hybrid channel.

When the hybrid channel arrives, carrier detection is performed whereby it is determined whether the hybrid channel is in use by another network device that may be transmitting contention-based communications. (Step 804) If another device tries an access simultaneously and a collision is detected at step 805, then the process proceeds to step 809 and waits for a time period of a randomly-selected duration. Next, a determination is made whether a point in time has been reached that corresponds to a predetermined, minimum amount of time (i. e., a time offset) prior to the end of the hybrid channel during that beacon cycle. (Step 810) If that point in time has been reached, then the process terminates. (Step 811) On the other hand if that point in time has not been reached, then the process loops back to step 804 where the detection process is repeated. The process should terminate at the time offset prior to the end of the hybrid channel because of a certain time required to access the hybrid channel. Otherwise, the process may proceed with an attempt to access the hybrid channel, but the end of the channel would arrive before it could be accessed for communications.

Returning to step 805, if on the other hand no collision is detected, the device starts access to the hybrid channel for contention-based communications. (Step 806) At step 807, the process determines whether the hybrid channel time period has ended. If it has not, then the device continues to have access to the hybrid channel for communications. On the other hand, if the hybrid channel time period is over, access to the hybrid channel by the device is terminated (step 808) for that beacon cycle and the process ends at step 811.

Figure 5:
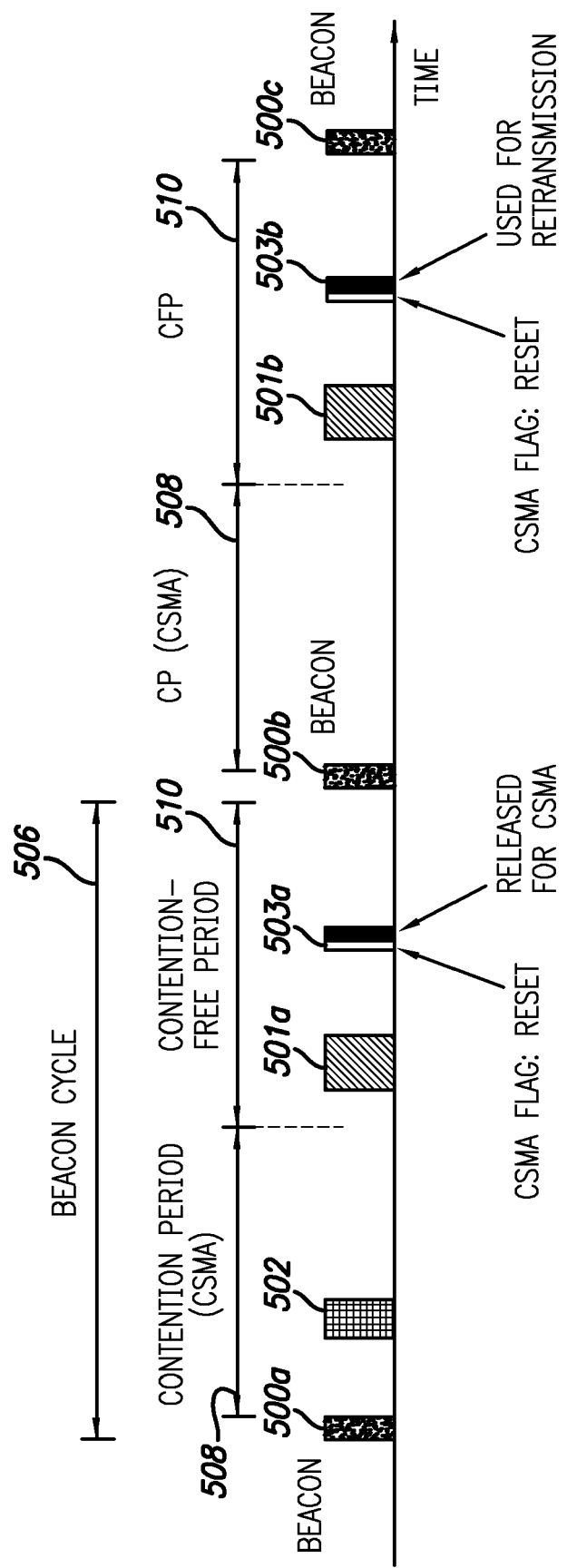
FIG. 5 is a timing diagram according to another embodiment of the invention.

FIG. 5 shows an alternative embodiment of the invention relating to the use and control of a hybrid channel. A beacon cycle 506 is divided into a CP 508 for CSMA or other contention-based communications and a CFP 510 for contention-free communications. A plurality of beacons 500a, 500b, 500c mark the beginning of each beacon cycle 506. Contention-based communication data 502 is transmitted during the CP 508 of the first beacon cycle 506. A stream of AV data 501a, 501b is transmitted as contention-free data during the CFP 510. A hybrid channel 503a, 503b is designated for use in the CFP 510.

In the embodiment of FIG. 5, the hybrid channel 503a, 503b has flag status data located at the beginning of the time allocation for the hybrid channel 503a, 503b. The transmitter (e.g., the first server 106 in FIG. 1), which need not be the master server, directly modifies the flag data located in the hybrid channel 503a, 503b. The master server (e.g., the second server 108) is not needed to modify the flag data and the flag data is not located in the beacon 500a. Therefore a network device that wants to use the hybrid channel for contention-based transmissions checks the flag status upon arrival of the hybrid channel. If the flag is in the "set" status, that device is permitted to attempt access to the hybrid channel during that same beacon cycle 506 for use in contention-based communications.

Figure 9:
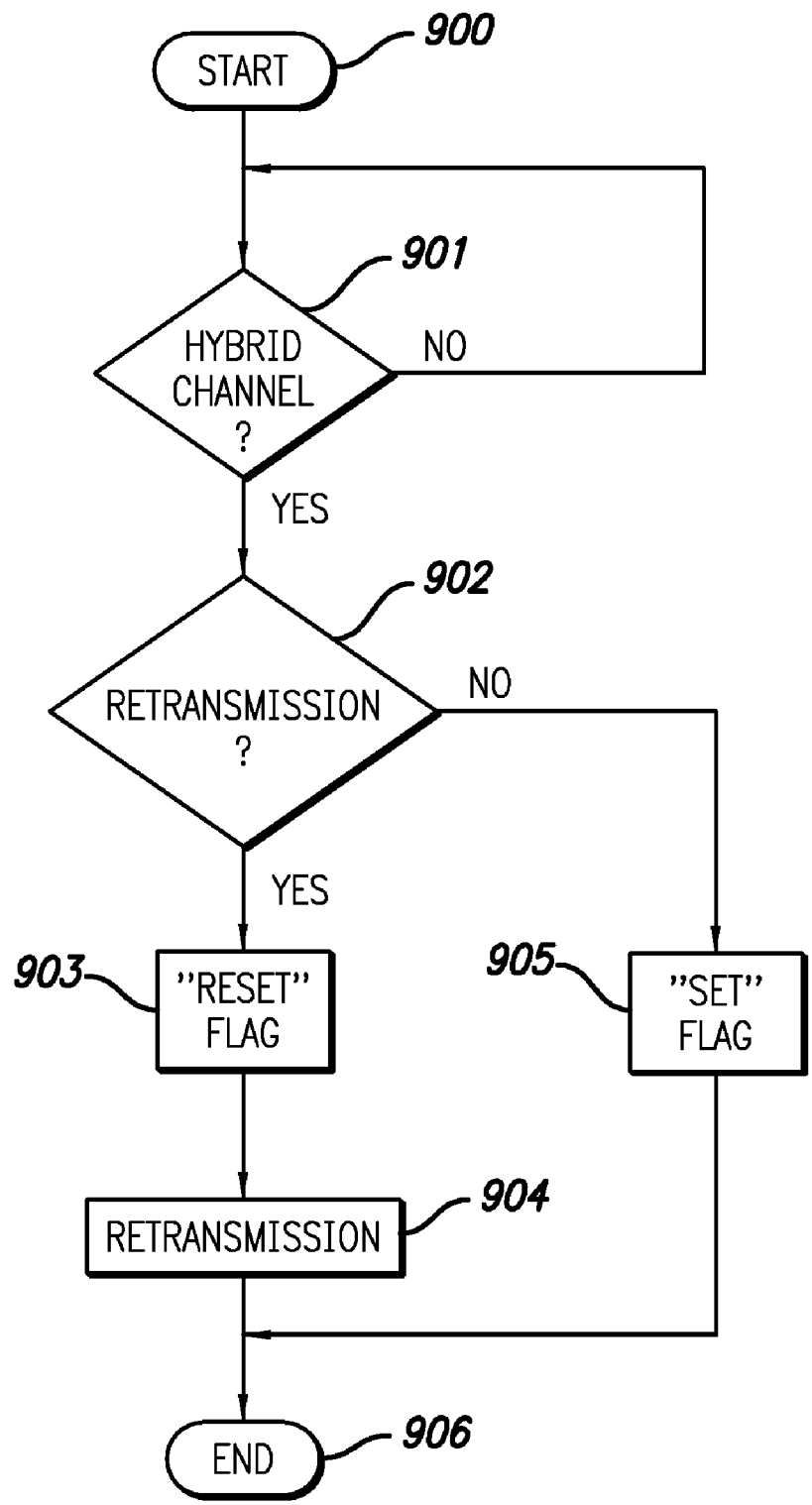
FIG. 9 is a process flow diagram showing the operation of a transmitter according to another embodiment of the invention.

FIG. 9 shows a process flow diagram illustrating the control of a hybrid channel (containing flag status information) by a transmitter (e.g., the first server 106 in FIG. 1) that is conducting contention-free transmissions in the CFP. The process starts at step 900 and proceeds to a waiting loop (step 901) where the process waits for the arrival of the hybrid channel. When the hybrid channel arrives, a determination is made whether the transmitter needs to use the hybrid channel for contention-free communications, such as for example, for the retransmission of certain data where there has been a missed packet. (Step 902) If contention-free communications are necessary, the process proceeds to step 903 where the transmitter places the flag data (located at the beginning of the hybrid channel time period) in a "reset" status. Then the transmitter transmits the necessary data as contention-free data using the hybrid channel. (Step 904) When the transmission is complete or when the hybrid channel time period has expired for that beacon cycle, the process terminates. (Step 906)

Returning to step 902, if on the other hand it is determined that it is not necessary for the transmitter to transmit contention-free data during this beacon cycle, then the process proceeds to step 905 where the flag is placed in a "set" status which releases the hybrid channel for use for contention-based communications by other devices on the network. Then the process proceeds to step 906 where it terminates.

Figure 10:
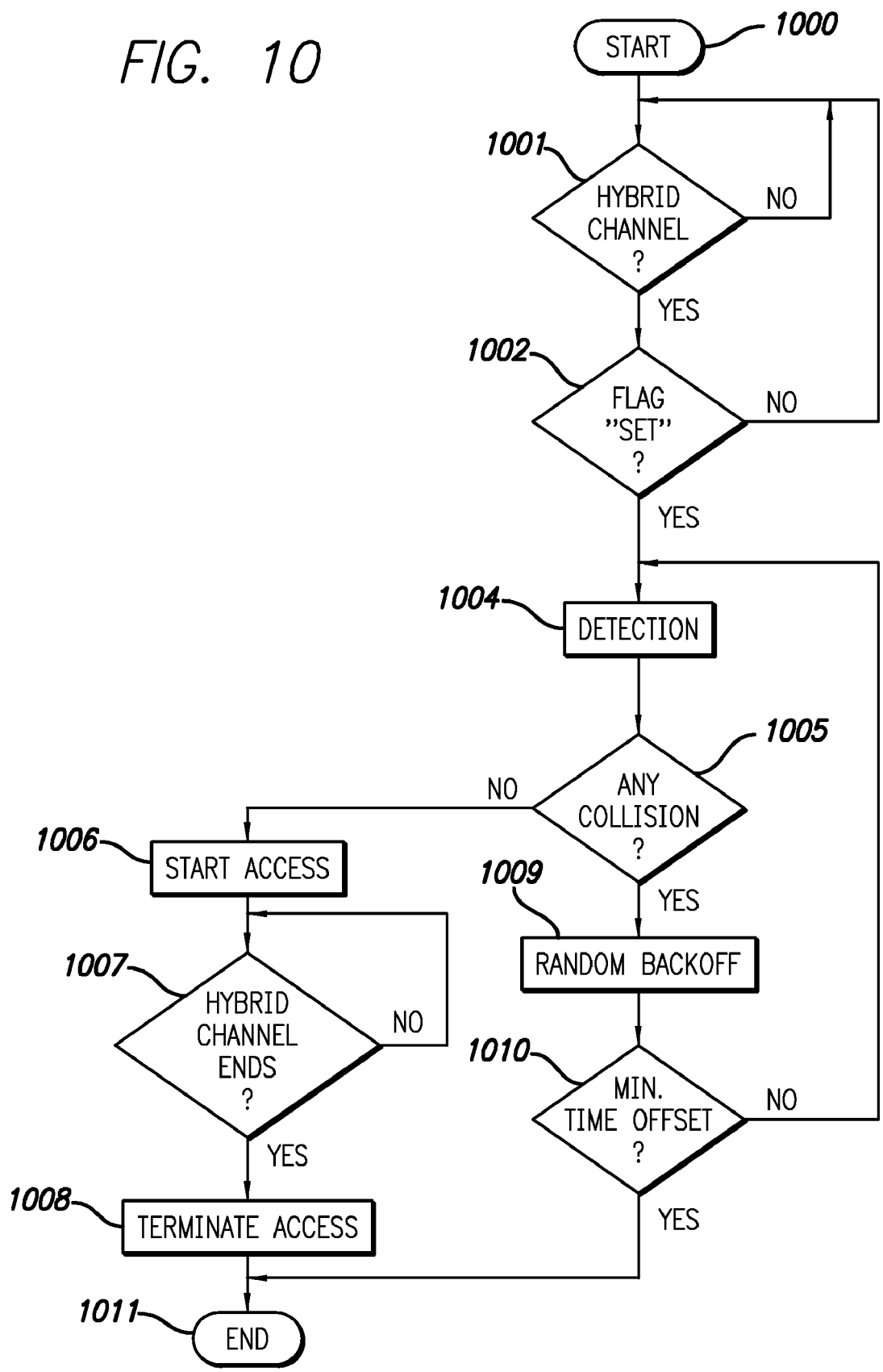
FIG. 10 is a process flow diagram showing the operation of another network device according to another embodiment of the invention.

FIG. 10 is a process flow diagram showing the use of a hybrid channel (containing flag status information) for contention-based communications by a network device. The process starts at step 1000 and proceeds to a waiting loop (step 1001) where the process waits for the arrival of the hybrid channel. When the hybrid channel time period arrives, a determination is made whether the flag (located at the beginning of the hybrid channel time period) is in a "set" status. (Step 1002) If the flag is not in a "set" status (i.e., the flag is "reset"), then this indicates that the hybrid channel is not available for use for contention-based communications during this beacon cycle and the process loops back to step 1001 to wait for the arrival of the next hybrid channel.

On the other hand, if the flag is in the "set" status, carrier detection is performed whereby it is determined whether the hybrid channel is in use by another network device that may be transmitting contention-based data. (Step 1004) If another device tries an access simultaneously and a collision is detected at step 1005, then the process proceeds to step 1009 where the process waits for a time period of a randomly-selected duration. Next, a determination is made whether a point in time has been reached that corresponds to a predetermined, minimum amount of time (i.e., a time offset) prior to the end of the hybrid channel for that beacon cycle. (Step 1010) If that point in time has been reached, then the process terminates. (Step 1011) On the other hand if that point in time has not been reached, then the process loops back to step 1004 where the detection process is repeated.

Returning to step 1005, if on the other hand no collision is detected, the device starts access to the hybrid channel for contention-based communications. (Step 1006) At step 1007, the process determines whether the hybrid channel time period has ended. If it has not, then the device continues to have access to the hybrid channel for communications. On the other hand, if the hybrid channel time period is over, access to the hybrid channel by the device is terminated (step 1008) for that beacon cycle and the process ends at step 1011.

Thus it can be seen that embodiments of the invention have various advantages. They include the flexibility of a channel that is reserved in the CFP, but can be used for contention-based communications when the channel is not needed for contention-free transmission purposes. Thus network bandwidth is more efficiently used. Moreover, the implementation of embodiments of the invention involves hardware or software modifications to existing systems that are not excessively expensive.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of communicating over a network using a communications protocol including the use of a plurality of communication cycles, wherein each of the plurality of communication cycles has a contention-based cycle portion and a contention-free cycle portion, and wherein the contention-free cycle portion includes a channel, the method comprising:
    sending a first command over the network to a first processor, wherein the first command is to set a flag to a first status, wherein the flag is adapted to be set to the first status and a second status;
    receiving the flag;
    sending a second command over the network to the first processor if the flag is not set to the first status, wherein the second command is to set the flag to the first status; and
    receiving data in a contention-based transmission over the channel if the flag is set to the first status,
    wherein the first status of the flag corresponds to a permission to use the channel for contention-based transmissions, and the second status of the flag corresponds to a permission to use the channel for contention-free transmissions.

2. The method of claim 1 wherein receiving the flag includes receiving a first set of data corresponding to the beginning of one of the plurality of communication cycles, wherein the first set of data includes the flag.

3. The method of claim 1 wherein sending the first command includes sending the first command during one of the plurality of contention-based cycle portions, and wherein sending the second command includes sending the second command during another of the plurality of contention-based cycle portions.

4. The method of claim 1 wherein the permission to use the channel for contention-free transmissions includes permission to use the channel for retransmission of data packets that were not received via an earlier transmission.

5. The method of claim 1 wherein the permission to use the channel for contention-free transmissions includes permission to use the channel for transmission of a third command from a remote control device.

6. The method of claim 1 wherein the permission to use the channel for contention-based transmissions includes permission to use the channel for transmission of one of file transfer data and Internet communication data.

7. The method of claim 1 wherein the contention-based cycle portion uses a CSMA protocol.

8. The method of claim 1 further comprising transmitting a stream of data over the network during the contention-free cycle portion of each of the plurality of communication cycles, wherein the stream of data is one of an audio/visual data stream and a voice over Internet protocol (VoIP) data stream.

9. The method of claim 1 wherein the network is a power line communication (PLC) network.

10. A method of communicating over a network using a communications protocol including the use of a plurality of communication cycles, wherein each of the plurality of communication cycles has a contention-based cycle portion and a contention-free cycle portion, and wherein the contention-free cycle portion includes a channel, the method comprising:
    sending a first command over the network to a first processor, wherein the first command is to set a flag to a second status, wherein the flag is adapted to be set to a first status and the second status;
    receiving the flag;
    sending a second command over the network to the first processor if the flag is not set to the second status, wherein the second command is to set the flag to the second status; and
    receiving data in a contention-free transmission over the channel if the flag is set to the second status,
    wherein the first status of the flag corresponds to a permission to use the channel for contention-based transmissions and the second status of the flag corresponds to a permission to use the channel for contention-free transmissions.

11. The method of claim 10 wherein receiving the flag includes receiving a first set of data corresponding to the beginning of one of the plurality of communication cycles, wherein the first set of data includes the flag.

12. The method of claim 10 wherein sending the first command includes sending the first command during one of the plurality of contention-based cycle portions, and wherein sending the second command includes sending the second command during another of the plurality of contention-based cycle portions.

13. The method of claim 10 wherein the permission to use the channel for contention-free transmissions includes permission to use the channel for retransmission of data packets that were not received via an earlier transmission.

14. The method of claim 10 wherein the permission to use the channel for contention-free transmissions includes permission to use the channel for transmission of a third command from a remote control device.

15. The method of claim 10 wherein the permission to use the channel for contention-based transmissions includes permission to use the channel for transmission of one of file transfer data and Internet communication data.

16. The method of claim 10 wherein the contention-based cycle portion uses a CSMA protocol.

17. The method of claim 10 further comprising transmitting a stream of data over the network during the plurality of contention-free cycle portions, wherein the stream of data is one of an audio/visual data stream and a voice over Internet protocol (VoIP) data stream.

18. The method of claim 10 wherein the network is a power line communication (PLC) network.

19. A method of communicating over a network using a communications protocol including the use of a plurality of communication cycles, wherein each of the plurality of communication cycles has a contention-based cycle portion and a contention-free cycle portion, and wherein the contention-free cycle portion includes a channel, the method comprising:
    determining whether a contention-free transmission of data over the channel is needed during one of the plurality of communication cycles;

setting a flag to a first status if there was no determination that contention-free transmission of data over the channel is needed, wherein the flag is located in a portion of the channel, and wherein the first status corresponds to a permission to use the channel for contention-based transmissions;

setting the flag to a second status if there was a determination that a contention-free transmission of data over the channel is needed, wherein the second status corresponds to a permission to use the channel for contention-free transmissions; and sending the data in a contention-free transmission over the channel if the flag is set to the second status.

20. The method of claim 19 wherein the permission to use the channel for contention-free transmissions includes permission to use the channel for retransmission of data packets that were not received via an earlier transmission.

21. The method of claim 19 wherein the permission to use the channel for contention-free transmissions includes permission to use the channel for transmission of a command from a remote control device.

22. The method of claim 19 wherein the permission to use the channel for contention-based transmissions includes permission to use the channel for transmission of one of file transfer data and Internet communication data.

23. The method of claim 19 wherein the communications protocol includes a CSMA protocol for the plurality of contention-based cycle portions.

24. The method of claim 19 farther comprising transmitting a stream of data over the network during the plurality of contention-free cycle portions, wherein the stream of data is one of an audio/visual data stream and a voice over Internet protocol (VoIP) data stream.

25. The method of claim 19 wherein the network is a power line communication (PLC) network.

26. A method of communicating over a network using a communications protocol including the use of a plurality of communication cycles, wherein each of the plurality of communication cycles has a contention-based cycle portion and a contention-free cycle portion, and wherein the contention-free cycle portion includes a channel, the method comprising:

receiving a flag;

making a first determination whether the channel is in use if the flag is set to a first status, wherein the flag is adapted to be set to the first status and a second status;

making a second determination whether the channel is in use if the channel was in use based upon the first determination, wherein the second determination is made after waiting a time period after making the first determination, and wherein the time period has a length that is randomly determined; and receiving a first set of data in a contention-based transmission using the channel if it has been determined that the channel is not in use and if the flag is set to the first status, wherein the first status of the flag corresponds to a permission to use the channel for contention-based transmissions, and the second status of the flag corresponds to a permission to use the channel for contention-free transmissions.

27. The method of claim 26 wherein the first set of data is data that otherwise would be transmitted during at least one of the plurality of contention-based cycle portions.

28. The method of claim 26 wherein the first set of data is one of file transfer data and Internet communication data.

29. The method of claim 26 wherein the communications protocol includes a CSMA protocol for the plurality of contention-based cycle portions.

30. The method of claim 26 wherein the network is a power line communication (PLC) network.

31. The method of claim 26 wherein receiving the flag includes receiving a second set of data corresponding to the beginning of one of the plurality of communications cycles, wherein the second set of data includes the flag.

32. The method of claim 31 wherein the first set of data is data that otherwise would be transmitted during at least one of the plurality of contention-based cycle portions.

33. The method of claim 31 wherein the contention-based cycle portion uses a CSMA protocol.

34. The method of claim 31 wherein the network is a power line communication (PLC) network.

35. The method of claim 26 wherein the flag is located in a portion of the channel.

36. The method of claim 35 wherein the first set of data is data that otherwise would be transmitted during at least one of the plurality of contention-based cycle portions.

37. The method of claim 35 wherein the contention-based cycle portion uses a CSMA protocol.

38. The method of claim 35 wherein the network is a power line communication (PLC) network.

* * * * *

UNITED STATES PATENT AND TRADEMARK OFFICE
CERTIFICATE OF CORRECTION

PATENT NO.        : 7,738,480 B2                                    Page 1 of 1
APPLICATION NO. : 11/278142
DATED             : June 15, 2010
INVENTOR(S)       : Ryuichi Iwamura It is certified that error appears in the above-identified patent and that said Letters Patent is hereby corrected as shown below:

Claim 24, column 13, line 29, delete "farther" and insert --further--.

Signed and Sealed this

Twenty-eighth Day of September, 2010

David J. Kappos
*Director of the United States Patent and Trademark Office*